(12) United States Patent
Wei et al.

(10) Patent No.: US 10,649,095 B2
(45) Date of Patent: May 12, 2020

(54) METHOD AND APPARATUS FOR JOINT DATA-PILOT TRACKING OF NAVIGATION SIGNAL

(71) Applicant: HUAZHONG UNIVERSITY OF SCIENCE AND TECHNOLOGY, Wuhan (CN)

(72) Inventors: Jiaolong Wei, Wuhan (CN); Zuping Tang, Wuhan (CN); Jianfeng Shi, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 369 days.

(21) Appl. No.: 15/586,254

(22) Filed: May 3, 2017

(65) Prior Publication Data
US 2017/0234987 A1    Aug. 17, 2017

Related U.S. Application Data

(63) Continuation-in-part of application No. PCT/CN2015/075671, filed on Apr. 1, 2015.

(30) Foreign Application Priority Data

Feb. 10, 2015  (CN) .......................... 2015 1 0070094

(51) Int. Cl.
   *G01S 19/29*  (2010.01)
   *G01S 19/24*  (2010.01)
   *G01S 19/30*  (2010.01)

(52) U.S. Cl.
   CPC .............. *G01S 19/29* (2013.01); *G01S 19/24* (2013.01); *G01S 19/30* (2013.01)

(58) Field of Classification Search
   CPC .......... G01S 19/29; G01S 19/24; G01S 19/30; G01S 19/00; G01S 19/55
   (Continued)

(56) References Cited

U.S. PATENT DOCUMENTS

2007/0009014 A1   1/2007  Eerola et al.
2011/0261805 A1*  10/2011 Landry, Jr. .............. G01S 19/24
                                                            370/342

FOREIGN PATENT DOCUMENTS

CN        101183149 A        5/2008
CN        101213471 A        7/2008
            (Continued)

OTHER PUBLICATIONS

Tracking Techniques for GNSS Data/Pilot Signals, Kannan Muthuraman, Geomatics Engineering, Jan. 2010.*
(Continued)

*Primary Examiner* — Vladimir Magloire
*Assistant Examiner* — Michael W Justice
(74) *Attorney, Agent, or Firm* — Matthias Scholl P.C.; Matthias Scholl

(57) ABSTRACT

A method for joint data-pilot tracking of navigation signal, including: multiplying a digital intermediate frequency signal with a local carrier to accomplish carrier removal; multiplying a signal after the carrier removal with a data baseband signal and a pilot baseband signal respectively to accomplish code removal; processing a signal after the code removal with integration-and-dump to obtain a coherent integration result of each branch; using the coherent integration results to accomplish data-bit flip detection and calculation of probability-weighting factor; acquiring a data-pilot joint carrier tuning-amount, and tuning the carrier numerically controlled oscillator by the carrier tuning-amount to realize data-pilot joint signal carrier tracking; and (Continued)

acquiring a data-pilot joint code tuning-amount, and tuning the code numerically controlled oscillator to realize baseband signal tracking.

8 Claims, 5 Drawing Sheets

(58) Field of Classification Search
USPC .................................................. 342/357.68
See application file for complete search history.

(56) References Cited

FOREIGN PATENT DOCUMENTS

| CN | 101854170 A | 10/2010 |
|---|---|---|
| CN | 103558612 A | 2/2014 |
| JP | 2009014451 A | 1/2009 |
| JP | 2012528338 A | 11/2012 |
| WO | 2014195712 A1 | 12/2014 |

OTHER PUBLICATIONS

D. Xu et al., Dual-component combined tracking of GPS L5 signals, Sci Sin Phys Mech Astron, 2011, pp. 653-662, vol. 41, No. 5, Science China Press, Beijing, China.

J. H. Won et al., Trade-off between data rate and signal power split in GNSS Signal Design, IEEE Transactions on Aerospace and Electronic Systems, Jul. 2012, pp. 2260-2281, vol. 48, No. 3, IEEE Aerospace and Electronic Systems Society, United States.

A. Jovanovic et al., Dual channel optimization of tracking schemes for E1 CBOC signal, 2011 IEEE Vehicular Technology Conference (VTC Fall), 2011, IEEE, United States.

Y. Shen et al., The research on the combination of discriminators in Galileo L1 F signal carrier tracking loop, Jouma of Astronautics, Mar. 2012, pp. 380-386, vol. 33, No. 3, Chinese Society of Astronautics, Beijing, China.

L. Ries et al., Tracking and multipath performance assessments of BOC signals using a bit-level signal processing simulator, Proceedings of International Technical Meeting of the Satellite Division of the Institute of Navigation, Sep. 2003, pp. 1996-2010, Institute of Navigation, Portland, United States.

\* cited by examiner

METHOD AND APPARATUS FOR JOINT DATA-PILOT TRACKING OF NAVIGATION SIGNAL

CROSS-REFERENCE TO RELATED APPLICATIONS

This application is a continuation-in-part of International Patent Application No. PCT/CN2015/075671 with an international filing date of Apr. 1, 2015, designating the United States, now pending, and further claims foreign priority benefits to Chinese Patent Application No. 201510070094.4 filed Feb. 10, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method and an apparatus for joint data-pilot tracking of navigation signal.

Description of the Related Art

A pilot channel is typically introduced to improve navigation signal tracking performance. A pilot signal does not have a modulated data bit and the problem of data-bit flip, thus a longer coherent-integration time can be used in pilot signal tracking, thereby improving tracking accuracy. In addition, pilot-channel carrier tracking employs a pure phase-locked loop, which is sensitive to data-bit flip and is much superior to, in terms of tracking sensitivity, a Costas loop employed by data-channel carrier tracking. However, in such pilot-only tracking mode, data-channel signal is not involved in tracking, resulting in energy loss.

Joint data-pilot tracking of navigation signal has been developed primarily based on two categories: data-pilot non-coherent accumulation and data-pilot coherent accumulation. However, the data-pilot non-coherent accumulation brings in squaring loss and the data channel adopts the Costas loop, all these affect the tracking sensitivity. The data-pilot coherent accumulation has optimal tracking performance at high carrier-to-noise ratios but it performs poorly at low carrier-to-noise ratios.

SUMMARY OF THE INVENTION

In view of the above-described problems, it is one objective of the invention to provide a method and an apparatus for joint data-pilot tracking of navigation signal, which possess high-tracking accuracy and high-tracking-sensitivity and are adaptable to track navigation signal containing a pilot channel.

To achieve the above objective, in accordance with one embodiment of the invention, there is provided a method for joint data-pilot tracking of navigation signal. The method comprises:

1) multiplying a digital intermediate frequency (IF) signal with a local carrier to accomplish carrier removal, in which, the local carrier adopts an inphase branch and a quadrature branch;
2) multiplying a signal after the carrier removal with a data baseband signal and a pilot baseband signal respectively to accomplish code removal, in which, a baseband signal adopts an early branch, a prompt branch, and a late branch and includes the data baseband signal and the pilot baseband signal;
3) processing a signal after the code removal with integration-and-dump to obtain a coherent integration result of each branch, in which, the coherent integration result of the pilot channel comprises: inphase-early $I_{PE}$, inphase-prompt $I_{PP}$, inphase-late $I_{PL}$, quadrature-early $Q_{PE}$, quadrature-prompt $Q_{PP}$ and quadrature-late $Q_{PL}$; and the coherent integration result of the data channel comprises: inphase-early $I_{DE}$, inphase-prompt $I_{DP}$, inphase-late $I_{DL}$, quadrature-early $Q_{DE}$, quadrature-prompt $Q_{DP}$ and quadrature-late $Q_{DL}$;
4) using the coherent integration result of each prompt-branch to accomplish data-bit flip detection, to obtain a data-bit-flip-detection output Flip=sign($I_{PP} \times I_{DP} + Q_{PP} \times Q_{DP}$) where, sign denotes a signbit function, and sign (x) indicates an output +1 when x is greater than or equal to 0 and an output −1 when x is less than 0;
5) using the power ratio between the data channel and the pilot channel to calculate an optimal power-weighting factor $$\alpha_1 = \sqrt{\frac{P_1}{P_2}},$$

where, $P_1$ and $P_2$ denote the data channel signal power and the pilot channel signal power respectively;
6) using the coherent integration result of each prompt-branch to calculate a probability-weighting factor $\alpha_2$ which has the same monotone as the correction-probability of the data-bit flip detection;
7) calculating the coherent integration results of inphase-prompt $I_P$ and quadrature-prompt $Q_P$ according to formulas as follows:

$$I_P = I_{PP} + \text{Flip} \times I_{DP} \times \alpha_1 \quad Q_P = Q_{PP} + \text{Flip} \times Q_{DP} \times \alpha_1$$

performing phase-discrimination to the coherent integration results of the inphase-prompt $I_P$ and the quadrature-prompt $Q_P$ to obtain a phase-discrimination output $\Delta\varphi$; multiplying the phase-discrimination output $\Delta\varphi$ with the probability-weighting factor $\alpha_2$ and performing loop-filtering to obtain a data-pilot joint carrier tuning-amount; feeding the data-pilot joint carrier tuning-amount back to a carrier numerically controlled oscillator (NCO) controlling the local carrier, and tuning the carrier numerically controlled oscillator to realize data-pilot joint signal carrier tracking;
8) calculating the coherent integration results of data-pilot joint inphase-early $I_E$, inphase-late $I_L$, quadrature-early $Q_E$ and quadrature-late $Q_L$ according to formulas as follows:

$$I_E = I_{PE} + \text{Flip} \times I_{DE} \times \alpha_1 \quad I_L = I_{PL} + \text{Flip} \times I_{DL} \times \alpha_1$$

$$Q_E = Q_{PE} + \text{Flip} \times Q_{DE} \times \alpha_1 \quad Q_L = Q_{PL} + \text{Flip} \times Q_{DL} \times \alpha_1$$

performing phase-discrimination to the coherent integration results of inphase-early $I_E$, inphase-late $I_L$, quadrature-early $Q_E$ and quadrature-late $Q_L$ to obtain a phase-discrimination result $\Delta\tau$; multiplying the phase-discrimination result $\Delta\tau$ with the probability-weighting factor $\alpha_2$ and performing loop-filtering to obtain a data-pilot joint code tuning-amount; feeding the data-pilot joint code tuning-amount back to a code NCO controlling the baseband signal, and tuning the code NCO to realize baseband signal tracking.

In a class of this embodiment, the digital IF signal received in 1) contains the data channel and the pilot channel with a constant phase difference therebetween.

In a class of this embodiment, the digital IF signal received in 1) is given by the expression as follows:

$$s_{IF}(t)=\sqrt{2P_1}d(t)c_d(t-\tau)e^{j(\omega_{IF}t+\varphi_0)}+\sqrt{2P_2}c_p(t-\tau)e^{j(\omega_{IF}t+\varphi_0+\vartheta)}+n(t)$$

where, $P_1$ denotes the data-channel power; d(t) denotes the data-bit sign at current moment t; $c_d$ denotes the data-channel spreading code; $\tau$ denotes time delay of signal; $\omega_{IF}$ denotes angular frequency of signal; $\varphi_0$ denotes initial phase of carrier; $\vartheta$ denotes a phase difference between the data baseband signal and the pilot baseband signal; $P_2$ denotes the pilot-channel power; $c_p$ denotes the pilot-channel spreading code; n(t) denotes noise and other signals those are uncorrelated with data/pilot component.

In a class of this embodiment, in 3), the early branch, the prompt branch, and the late branch of the pilot-channel baseband signal are respectively multiplied with the inphase branch of the signal, and then through accumulation respectively, the coherent integration results of the pilot inphase-early, -prompt and -late are obtained; the early branch, the prompt branch, and the late branch of the pilot-channel baseband signal are also respectively multiplied with the quadrature branch of the signal, and then through accumulation respectively, the coherent integration results of the pilot quadrature-early, -prompt and -late are obtained; and the early branch, the prompt branch, and the late branch of the data-channel baseband signal are respectively multiplied with the inphase branch of the signal, and then through accumulation respectively, the coherent integration results of the data inphase-early, -prompt and -late are obtained; also, the early branch, the prompt branch, and the late branch of the data-channel baseband signal are respectively multiplied with the quadrature branch of the signal, and then through accumulation respectively, the coherent integration results of the data quadrature-early, -prompt and -late are obtained.

In a class of this embodiment, in 4), the data-bit-flip-detection output Flip=1 indicates that the data channel and the pilot channel are in phase, Flip=-1 indicates that the data channel and the pilot channel have a phase difference of 180° therebetween.

In a class of this embodiment, in 6), the probability-weighting factor is $$\alpha_2 = \frac{Q_{PP} \times Q_{DP} + I_{PP} \times I_{DP}}{\sqrt{(I_{DP}^2 + Q_{DP}^2)(I_{PP}^2 + Q_{PP}^2)}}.$$

In a class of this embodiment, in 7), the phase-discrimination is performed to the coherent integration results of inphase-prompt $I_P$ and quadrature-prompt $Q_P$, by using a pure phase-locked loop phase discriminator.

In a class of this embodiment, in 8), the joint coherent integration results $I_E$, $Q_E$ as well as $I_L$, $Q_L$ are performed with non-coherent accumulation respectively to obtain an early non-coherent accumulation result $E_S$ and a late non-coherent accumulation result $L_S$ using the following mathematical expressions:

$$E_S = \sum_{k=1}^{N}(I_E^2(k) + Q_E^2(k))$$

-continued $$L_S = \sum_{k=1}^{N}(I_L^2(k) + Q_L^2(k))$$

where, N denotes the number of times of non-coherent accumulation; and phase-discrimination is performed on the early non-coherent accumulation result $E_S$ and the late non-coherent accumulation result $L_S$ to obtain the phase discrimination result $\Delta\tau$.

In accordance with one embodiment of the invention, there is provided an apparatus for joint data-pilot tracking of navigation signal. The apparatus comprises: a carrier remover, a code remover, a local carrier generator, a baseband signal generator, a carrier NCO, a code NCO, an integration-and-dump unit, a data-bit flip detector, a probability-weighting factor calculator, a power-weighting factor calculator, a data-pilot joint carrier tuning-amount estimator, and a data-pilot joint code tuning-amount estimator.

The carrier NCO is used to control the local carrier generator to generate a local carrier. The code NCO is used to control the baseband signal generator to generate a baseband signal comprising a data baseband signal and a pilot baseband signal. The carrier remover is used to act on the local carrier and a digital IF signal to accomplish carrier removal. The code remover is used to act on the signal after carrier removal and the baseband signal to accomplish code removal. The integration-and-dump unit is used to obtain coherent integration results of the signal after code removal. Among the coherent integration results, the prompt-branch coherent integration result is sent into the data-bit flip detector to obtain a data-bit flip detection output. The prompt-branch coherent integration result is also sent into the probability-weighting factor calculator to obtain a probability-weighting factor. The power-weighting factor calculator is used to determine the power ratio between the data channel and the pilot channel to obtain a power-weighting factor. The prompt-branch coherent integration result is also sent into the data-pilot joint carrier tuning-amount estimator to obtain a carrier tuning-amount, and by using the carrier tuning-amount to control the carrier NCO, data-pilot joint signal carrier tracking is achieved. Among the coherent integration results, the early-branch and late-branch coherent integration results are sent into the data-pilot joint code tuning-amount estimator to obtain a code tuning-amount, and by using the code tuning-amount to control the code NCO, baseband signal tracking is achieved.

Advantages of the method and the apparatus for joint data-pilot tracking of navigation signal according to embodiments of the invention are summarized as follows:

In the present invention, the introduction of a data-bit flip detector solves the data-bit flip problem, making it possible to coherently accumulate coherent integration results of a data channel and coherent integration results of a pilot channel, therefore an optimal tracking accuracy can be achieved in a high-carrier-to-noise-ratio environment. The introduction of a probability-weighting factor makes the output of a discriminator be weighted according to maximum-likelihood probability, therefore good tracking performance can be ensured in a low-carrier-to-noise-ratio environment, thus improving tracking sensitivity. Moreover, these two innovative structures are introduced after coherent integration and are low-speed processing elements, which brings no increase in the complexity of the high-speed processing parts, thus making the whole tracking device relatively simple and low-complexity.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing the method and the apparatus for joint data-pilot tracking of navigation signal are described below. It should be noted that the following examples are intended to describe and not to limit the invention.

Figure 1:
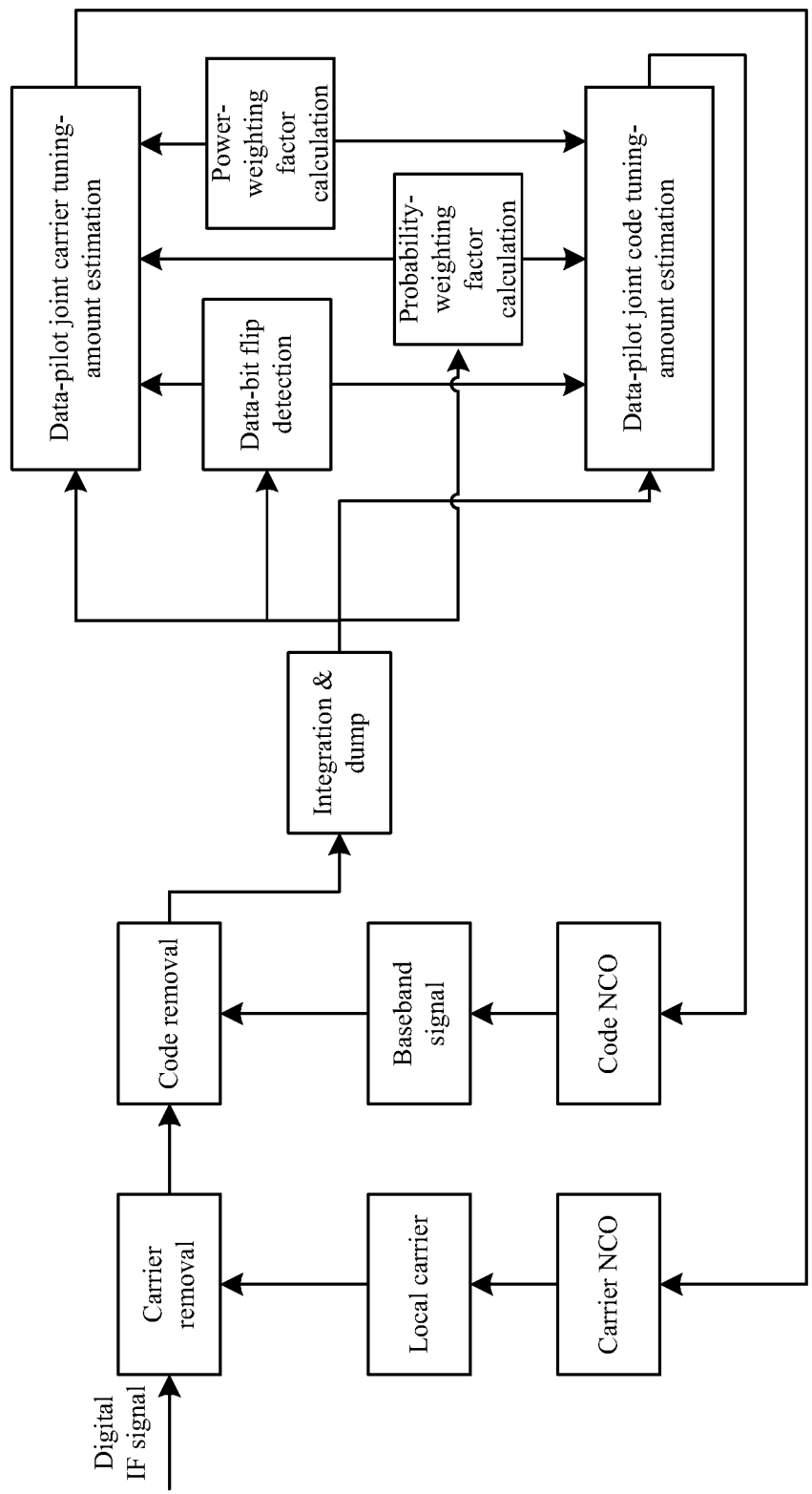
FIG. 1 is a flowchart of a method for joint data-pilot tracking of navigation signal according to the present invention.

FIG. 1 shows a flowchart of a method for joint data-pilot tracking of navigation signal according to the present invention; in FIG. 1, a digital intermediate frequency (IF) signal is multiplied with a local carrier controlled by a carrier numerically controlled oscillator (hereinafter referred to as NCO), to accomplish carrier removal; the signal after carrier removal is multiplied respectively with a data baseband signal and a pilot baseband signal which are controlled by a code NCO, to accomplish code removal; the signal after code removal passes through integration-and-dump processing to obtain a coherent integration result of each branch; the coherent integration results are utilized to accomplish data-bit flip detection and probability-weighting factor calculation; the power ratio between the data channel and the pilot channel is utilized to calculate a power-weighting factor; the data-bit flip detection result, the power-weighting factor and the probability-weighting factor assist data-pilot joint carrier tuning-amount estimation, to obtain a carrier tuning amount; the data-bit flip detection result, the power-weighting factor and the probability-weighting factor assist data-pilot joint code tuning-amount estimation, to obtain a code tuning amount; by using the carrier tuning-amount to control the carrier NCO, data-pilot joint signal carrier tracking is achieved; by using the code tuning-amount to control the code NCO, baseband signal tracking is achieved.

For convenience of description, a typical embodiment is given hereinbelow, which is merely illustrative by way of example but not intended to be limiting. It should be understood by those skilled in the art that, any modifications, equivalent substitutions, and the like, which are within the scope of the teachings of the present application and the scope of the claims, are intended to be included within the scope of the present invention.

Figure 2:
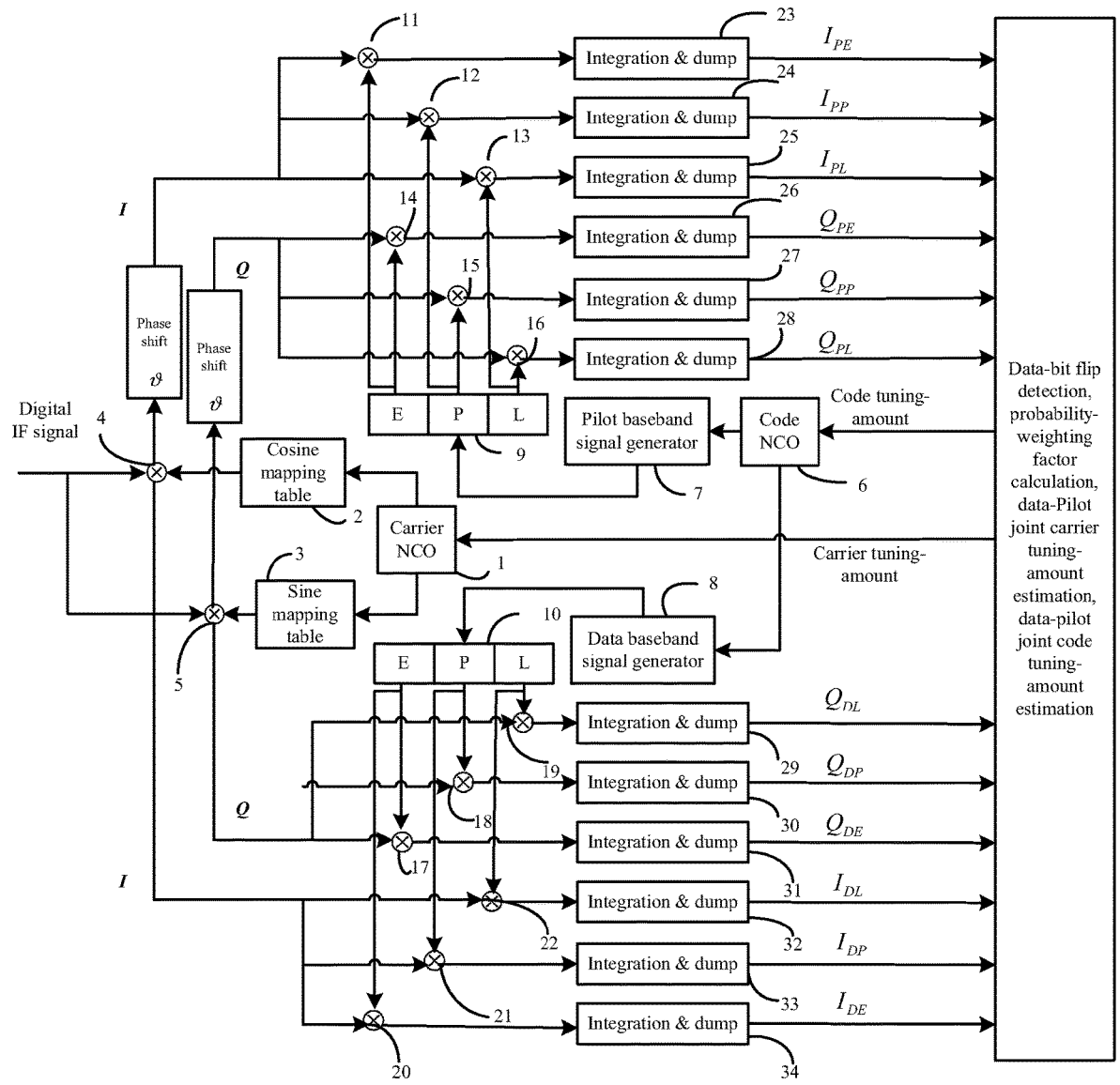
FIG. 2 is a block diagram showing overall implementation of the joint data-pilot tracking method according to an embodiment of the present invention.

FIG. 2 is a block diagram showing overall implementation of the joint data-pilot tracking method according to an embodiment of the present invention. In this embodiment of the present invention, the local carrier uses two branches, i.e., inphase (I) and quadrature (Q) branches, while the baseband signal uses three branches, i.e., early (E), prompt (P) and late (L) branches. For the embodiment of the present invention, the tracking start-point is digital IF signal, with no consideration of AD conversion and down-conversion of RF analog signal. The signal framework, to which the embodiment is directed, is navigation signal containing a pilot channel; the digital IF signal received is given by a mathematical expression shown as the following formula (1):

$$s_{IF}(t) = \sqrt{2P_1} d(t) c_d(t-\tau) e^{j(\omega_{IF} t + \varphi_0)} + \sqrt{2P_2} c_p(t-\tau) e^{j(\omega_{IF} t + \varphi_0 + \vartheta)} + n(t) \quad (1)$$

where, $P_1$ denotes the data-channel power; $d(t)$ denotes the data-bit sign at current moment t; $c_d$ denotes the data-channel spreading code; $\tau$ denotes time delay of signal; $\omega_{IF}$ denotes angular frequency of signal; $\varphi_0$ denotes initial phase of carrier; $\vartheta$ denotes a phase difference between the data baseband signal and the pilot baseband signal; $P_2$ denotes the pilot-channel power; $c_p$ denotes the pilot-channel spreading code; $n(t)$ $P_2$ denotes noise and other signals those are uncorrelated with data/pilot component. The mathematical expression given herein is not intended to limit the present invention, and any signal containing a data channel and a pilot channel with a constant phase difference therebetween does not depart from the scope of the present invention.

The detailed steps of the typical embodiment shown in FIG. 2 are as follows.

Step 1: Since it is joint data-pilot tracking, the data-channel signal and the pilot-channel signal should have the same frequency and a constant phase difference, so, the data channel and the pilot channel share a carrier NCO 1 and a code NCO 6. As shown in FIG. 2, the carrier NCO 1 controls a cosine mapping table 2 and a sine mapping table 3, respectively. The cosine mapping table 2 generates inphase carrier signal, and the sine mapping table 3 generates quadrature carrier signal. The inphase carrier signal and the digital IF signal pass—under control of sampling pulses—through a multiplier 4 where they are multiplied together to yield an inphase-branch signal I, meanwhile the quadrature carrier signal and the digital IF signal pass—under control of sampling pulses—through a multiplier 5 where they are multiplied together to yield a quadrature-branch signal Q.

Step 2: The code NCO 6 shared by the pilot channel and the data channel drives a pilot baseband signal generator 7 and a data baseband signal generator 8 respectively to generate an early pilot baseband signal and an early data baseband signal. The early pilot baseband signal—under action of a time delayer 9—produces a prompt pilot baseband signal and a late pilot baseband signal. The early data baseband signal—under action of a time delayer 10—produces a prompt data baseband signal and a late data baseband signal.

Step 3: the early branch, the prompt branch, and the late branch of the pilot-channel baseband signal are respectively multiplied—with the inphase-branch signal I after a phase shift $\vartheta$—via multipliers 11, 12, 13, and then through accumulation in integration-and-dump units 23, 24, 25, the coherent integration results of pilot inphase-early, -prompt and -late (i.e., $I_{PE}$, $I_{PP}$, $I_{PL}$) are obtained;

the early branch, the prompt branch, and the late branch of the pilot-channel baseband signal are respectively multiplied—with the quadrature-branch signal Q after a phase shift $\vartheta$—via multipliers 14, 15, 16, and then through accumulation in integration-and-dump units 26, 27, 28, the coherent integration results of pilot quadrature-early, -prompt and -late (i.e., $Q_{PE}$, $Q_{PP}$, $Q_{PL}$) are obtained;

the early branch, the prompt branch, and the late branch of the data-channel baseband signal are respectively multiplied—with the inphase-branch signal I—via multipliers 20, 21, 22, and then through accumulation in integration-and-dump units 34, 33, 32, the coherent integration results of data inphase-early, -prompt and -late (i.e., $I_{DE}$, $I_{DP}$, $I_{DL}$) are obtained;

the early branch, the prompt branch, and the late branch of the data-channel baseband signal are respectively multiplied—with the quadrature-branch signal Q—via multipliers 17, 18, 19, and then through accumulation in integration-and-dump units 31, 30, 29, the coherent integration results of data quadrature-early, -prompt and -late (i.e., $Q_{DE}$, $Q_{DP}$, $Q_{DL}$) are obtained.

Figure 3:
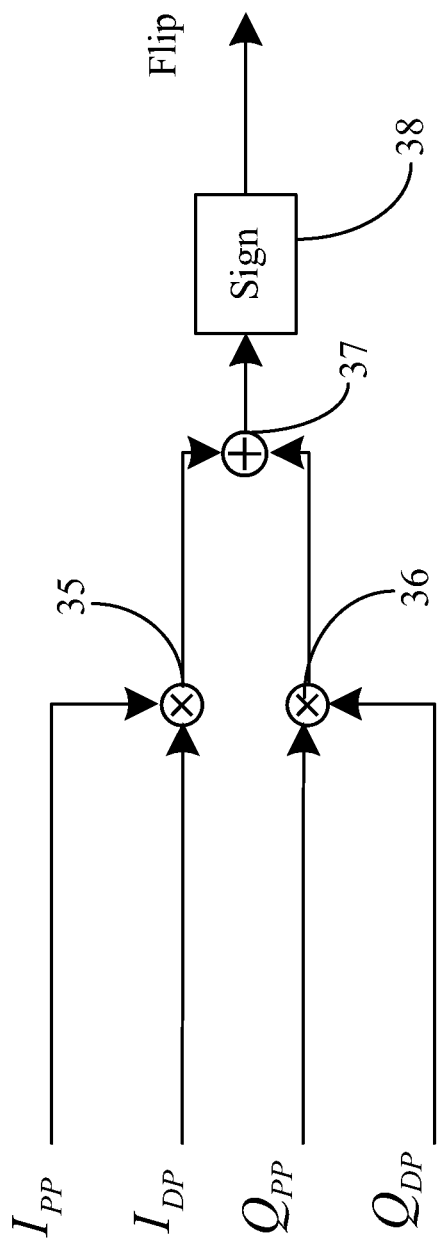
FIG. 3 is a block diagram showing implementation of the data-bit flip detection according to the present invention.

Step 4: The above-obtained prompt-branch coherent integration results $I_{PP}$, $Q_{PP}$, $I_{DP}$, $Q_{DP}$ are utilized for data-bit flip detection, and the implementation of data-bit flip detection is shown in a block diagram (FIG. 3). $I_{PP}$ and $I_{DP}$ are multiplied via a multiplier 35, while $Q_{PP}$ and $Q_{DP}$ are multiplied via a multiplier 36, then the two multiplication results are added together by an adder 37, thereafter by taking the sign of the adding result via a sign extractor 38, a data-bit flip detection output Flip is obtained:

$$\text{Flip} = \text{sign}(I_{PP} \times I_{DP} + Q_{PP} \times Q_{DP})$$

where, sign denotes a signbit function, and sign (x) indicates an output +1 when x is greater than or equal to 0 and an output −1 when x is less than 0, that is, the data-bit-flip-detection output Flip=1 indicates that the data channel and the pilot channel are in phase, Flip=−1 indicates that the data channel and the pilot channel have a phase difference of 180° therebetween.

Step 5: Power-weighting factor calculation. In a practical signal framework, the data-to-pilot power ration is not 1:1; therefore, the power influence needs to be considered during coherent accumulation of the data-pilot coherent integration results. A power-weighting factor $\alpha_1$ will directly affect the joint data-pilot tracking accuracy; this embodiment of the present invention gives an optimal power-weighting factor shown as the following formula (2):

$$\alpha_1 = \sqrt{\frac{P_1}{P_2}} \quad (2)$$

where, $P_1$ and $P_2$ denote the data channel signal power and the pilot channel signal power, respectively. By adopting the above power-weighting factor, the joint data-pilot tracking accuracy can be optimized.

Step 6: Probability-weighting factor calculation. For data-bit flip detection, due to the presence of noise, the detection result is not 100% correct, but has a certain probability of being correct. For a result with a high correction-probability, it can be considered that the output of the discriminator this time has a high probability in reliability, so it should be output with a larger weight; On the contrary, for a result with a low correction-probability, it can be considered that the output of the discriminator this time has a low probability in reliability, so it should be output with a smaller weight.

According to the above formula (1), the coherent integration results of the prompt branches of the data channel and the pilot channel are given by mathematical expressions shown as follows:

$$I_{DP} = \sqrt{\frac{2P_1 T_p}{N_0}} \times d \times \cos(\varphi_0) + n_{DIP} \quad (3)$$

$$Q_{DP} = \sqrt{\frac{2P_1 T_p}{N_0}} \times d \times \sin(\varphi_0) + n_{DQP} \quad (4)$$

$$I_{PP} = \sqrt{\frac{2P_2 T_p}{N_0}} \times d \times \cos(\varphi_0) + n_{PIP} \quad (5)$$

$$Q_{PP} = \sqrt{\frac{2P_2 T_p}{N_0}} \times d \times \sin(\varphi_0) + n_{PQP} \quad (6)$$

where, $T_p$ denotes coherent integration time; d denotes the current data bit; $n_{DIP}$, $n_{DQP}$, $n_{PIP}$, $n_{PQP}$ denote normalized noise after integration of each branch.

θ is defined as an included angle between the vector 1 ($I_{DP}$, $Q_{DP}$) and the vector 2 ($I_{PP}$, $Q_{PP}$). When no signal exists, $n_{DIP}$, $n_{DQP}$, $n_{PIP}$, $n_{PQP}$ are white noise with a mean value of 0, so θ should be evenly distributed within 0-180°. When signal exists, assuming d=1, then the signal parts of the two vectors should be in phase, so, the smaller the angle θ, the higher the probability. According to the principle of the data-bit flip detector described above, it determines that d=1 when θ<90°, and the smaller the angle θ, the higher the correction-probability of the determination, and the more the angle θ approximates to 90°, the lower the correction-probability of the determination; assuming d=−1, then the signal parts of the two vectors should be opposite in phase, so, the larger the angle θ, the higher the probability. According to the principle of the data-bit flip detector described above, it determines that d=−1 when θ>90°, and the more the angle θ approximates to 180°, the higher the correction-probability of the determination, and the more the angle θ approximates to 90°, the lower the correction-probability of the determination. In fact, when θ=90°, it can be regarded that, because of the presence of noise, it is now completely unable to determine whether d is positive or negative, so the result is completely unreliable and should be output with a weight of 0. However, in practical implementation, the calculation of such maximum-likelihood probability weight is very complicated, and thus is not conducive to engineering implementation; therefore, any weight factor that has the same monotone as the correction-probability of the data-bit flip detection can be used as an approximate probability-weighting factor, and the higher the approximation degree, the better the tracking results. In this embodiment of the present invention, the maximum-likelihood probability weight is substituted by a weight factor having the same monotone and a relatively high approximation degree. The probability-weighting factor $\alpha_2$ is defined by the following formula (7):

$$\alpha_2 = \frac{Q_{PP} \times Q_{DP} + I_{PP} \times I_{DP}}{\sqrt{(I_{DP}^2 + Q_{DP}^2)(I_{PP}^2 + Q_{PP}^2)}} \quad (7)$$

Such weight factor based on maximum-likelihood probability is not unique, and there are many additional approximation methods, and any weight factor that has the same monotone as the correction-probability of the data-bit flip detection does not depart from the scope of the present application.

Figure 4:
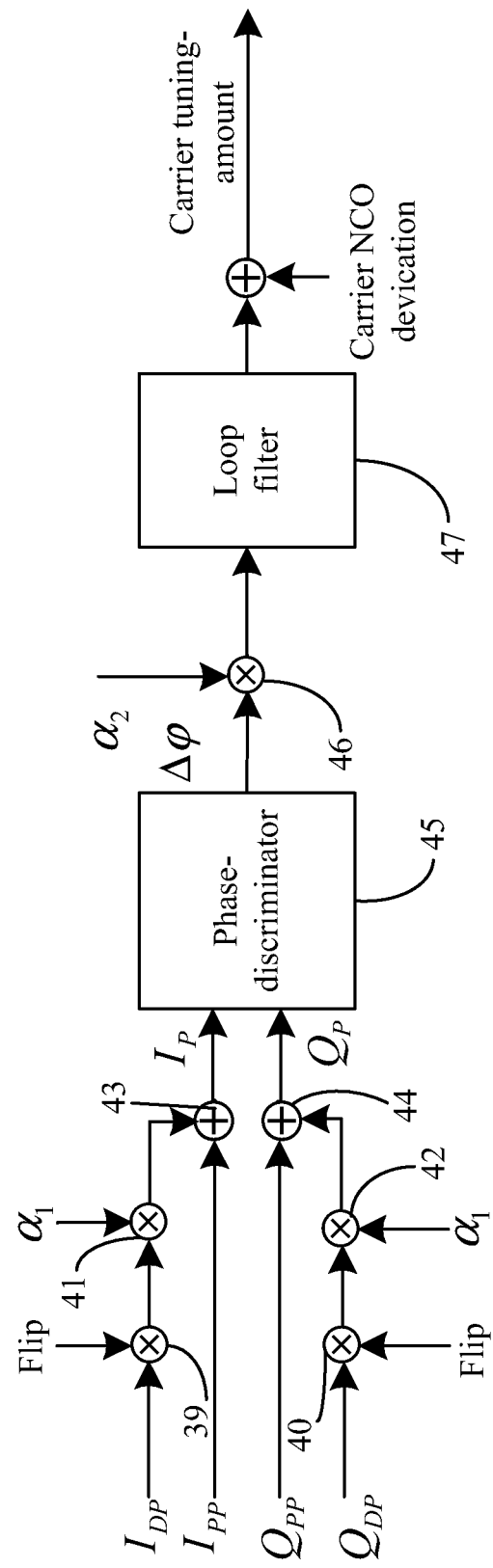
FIG. 4 is a block diagram showing implementation of the data-pilot joint carrier tuning-amount estimation according to the present invention.

Step 7: Implementation of data-pilot joint carrier tuning-amount estimation is shown in a block diagram (FIG. 4). The prompt-branch coherent integration results (i.e., $I_{PP}$, $Q_{PP}$, $I_{DP}$, $Q_{DP}$) are utilized for data-pilot joint carrier tuning-amount estimation. $I_{DP}$ and $Q_{DP}$ are respectively multiplied—with the output (i.e., Flip) of the data-bit flip detector—via multipliers 39, 40, to eliminate the influence of data-bit flip. Then the multiplication results are respectively multiplied—with the power-weighting factor $\alpha_1$—via multipliers 41, 42, of which the results are coherently accumulated with $I_{PP}$ and $I_{DP}$ respectively in adders 43, 44, thereby obtaining $I_P$ and $Q_P$. Subsequently, $I_P$ and $Q_P$ undergo phase-discrimination through a phase discriminator 45 to obtain a phase-discrimination output $\alpha\varphi$, and because of data-bit flip having been eliminated, a pure phase-locked loop phase discriminator can be employed, for example, a four-quadrant arctangent discriminator: $\arctan(I_P, Q_P)$. The phase-discrimination output $\alpha\varphi$ is multiplied—with the probability-weighting factor $\alpha_2$—via a multiplier 46, and then through a filtering process in a loop filter 47, an ultimate carrier tuning-amount is obtained. The carrier tuning-amount is fed back to the carrier NCO 1, as shown in FIG. 2, to turn the carrier NCO 1, thereby achieving data-pilot joint signal carrier tracking.

Figure 5:
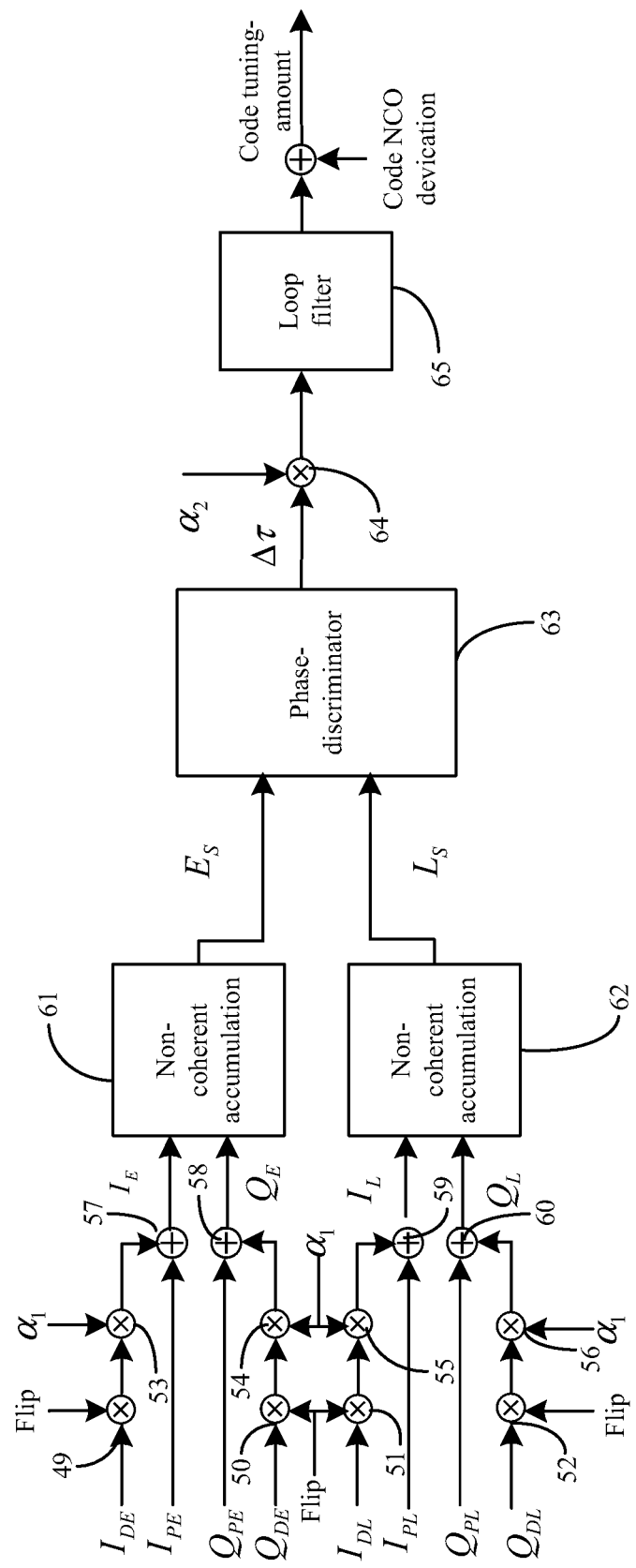
FIG. 5 is a block diagram showing implementation of the data-pilot joint code tuning-amount estimation according to the present invention.

Step 8: Implementation of data-pilot joint code tuning-amount estimation is shown in a block diagram (FIG. 5). The early-branch and late-branch coherent integration results (i.e., $I_{PE}$, $Q_{PE}$, $I_{PL}$, $Q_{PL}$, $I_{DE}$, $Q_{DE}$, $I_{DL}$, $Q_{DL}$) are utilized for data-pilot joint code tuning-amount estimation. $I_{DE}$, $Q_{DE}$, $I_{DL}$, $Q_{DL}$ are respectively multiplied—with the output (i.e., Flip) of the data-bit flip detector—via multipliers 49, 50, 51, 52, to eliminate the influence of data-bit flip. Then the multiplication results are respectively multiplied—with the power-weighting factor $\alpha_1$—via multipliers 53, 54, 55, 56, of which the results are coherently accumulated with $I_{PE}$, $Q_{PE}$, $I_{PL}$, $Q_{PL}$ respectively in adders 57, 58, 59, 60, thereby obtaining the joint coherent integration results $I_E$, $Q_E$, $I_L$, $Q_L$. There are many different implementations of a code phase discriminator. In order to maintain the integrity of the invention, a non-coherent early-minus-late discriminator is given herein, while other implementations do not depart from the scope of the present application. The joint coherence results $I_E$, $Q_E$ and $I_L$, $Q_L$ are non-coherently accumulated respectively via non-coherent accumulators 61, 62, thereby obtaining an early non-coherent accumulation result $E_S$ and a late non-coherent accumulation result $L_S$, of which the mathematical expressions are shown as the following formula (8):

$$E_S = \sum_{k=1}^{N} (I_E^2(k) + Q_E^2(k)) \quad (8)$$

$$L_S = \sum_{k=1}^{N} (I_L^2(k) + Q_L^2(k))$$

where, N denotes the number of times of non-coherent accumulation.

Subsequently, the early non-coherent accumulation result $E_S$ and the late non-coherent accumulation result $L_S$ undergo phase-discrimination through a phase discriminator 63 to obtain a phase-discrimination output. Here, a non-coherent early-minus-late square discriminator is adopted and normalized, and the adoption of such discriminator is only for maintaining the integrity of the invention, while other implementations do not depart from the scope of the present application. Its mathematical expression is shown as the following formula (9):

$$\Delta\tau = \frac{E_S - L_S}{E_S + L_S} \quad (9)$$

The phase-discrimination result $\Delta\tau$ is multiplied—with the probability-weighting factor—via a multiplier 64, and then through a filtering process in a loop filter 65, an ultimate code tuning-amount is obtained. The code tuning-amount is fed back to the code NCO 6, as shown in FIG. 2, to turn the code NCO 6, thereby achieving baseband signal tracking.

Figure 6:
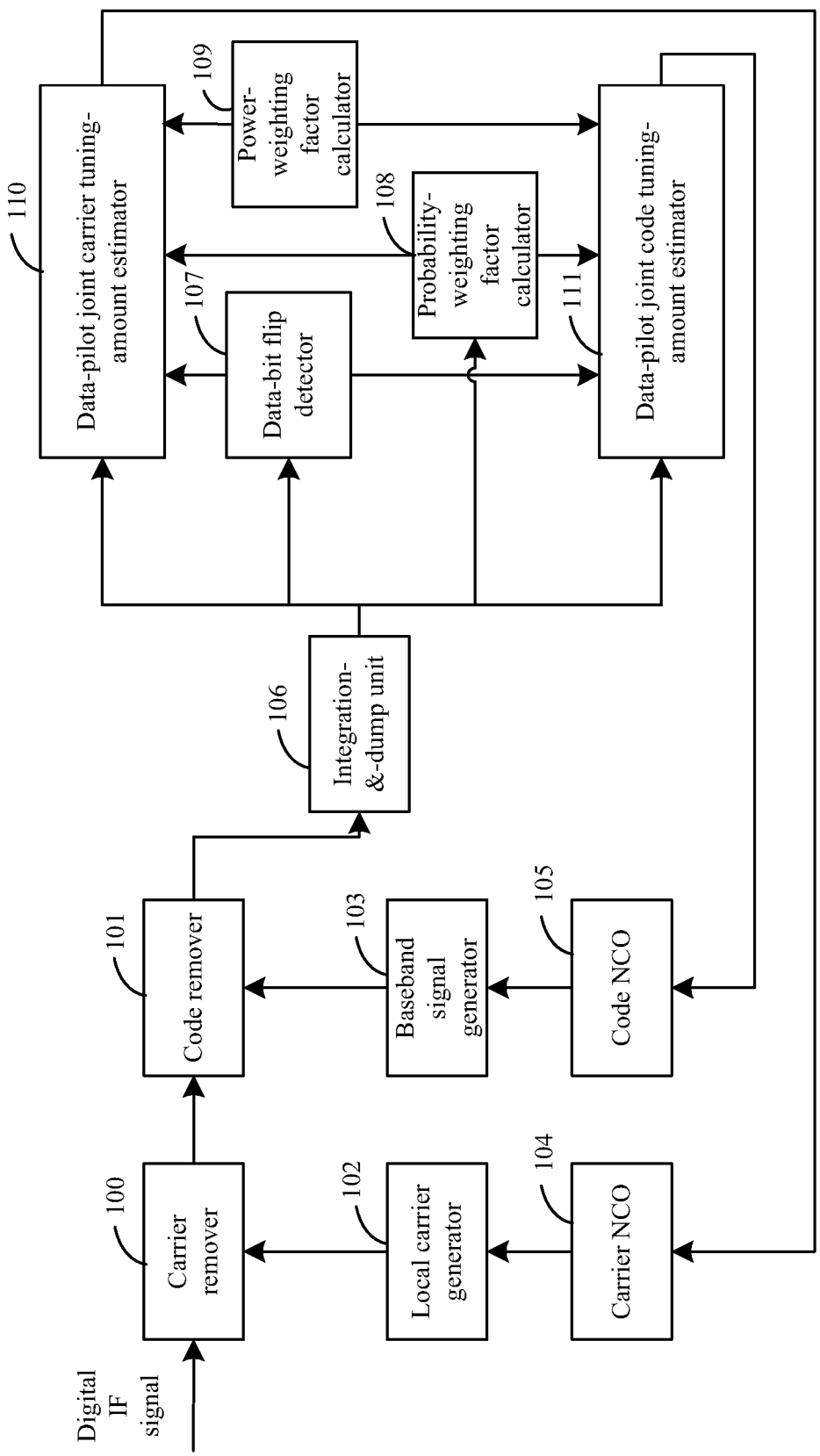
FIG. 6 is a block diagram showing overall configuration of a joint data-pilot tracking apparatus according to the present invention.

FIG. 6 is a block diagram showing an overall configuration of a joint data-pilot tracking apparatus according to the present invention; in FIG. 6, a carrier NCO 104 controls a local carrier generator 102 to generate a local carrier, and a code NCO 105 controls a baseband signal generator 103 to generates a baseband signal; it should be noted that, the baseband signal generated by the baseband signal generator 103 comprises a data baseband signal and a pilot baseband signal. The local carrier and a digital IF signal pass through a carrier remover 100 to accomplish carrier removal, then the signal after carrier removal and the baseband signal pass through a code remover 101 to accomplish code removal. The signal after code removal passes through an integration-and-dump unit 106 to obtain coherent integration results, of which the prompt-branch coherent integration result is sent into a data-bit flip detector 107 to obtain a data-bit flip detection output Flip; the principle of the data-bit flip detector 107 is as shown in FIG. 3. The prompt-branch coherent integration result is also sent into a probability-weighting factor calculator 108 to obtain a probability-weighting factor $\alpha_2$, of which the principle for implementation is defined by the formula (7). The power ratio between the data channel and the pilot channel is utilized by a power-weighting factor calculator 109 to obtain a power-weighting factor $\alpha_1$. The prompt-branch coherent integration result is also sent into a data-pilot joint carrier tuning-amount estimator 110, of which a typical embodiment is as shown in FIG. 4, so that the data-pilot joint carrier tuning-amount estimator 110 obtains a carrier tuning-amount, and by using the carrier tuning-amount to control the carrier NCO 104, data-pilot joint signal carrier tracking is achieved. Among the coherent integration results obtained by the integration-and-dump unit 106, the early-branch and late-branch coherent integration results are sent into a data-pilot joint code tuning-amount estimator 111, of which a typical embodiment is as shown in FIG. 5, so that the data-pilot joint code tuning-amount estimator 111 obtains a code tuning-amount, and by using the code tuning-amount to control the code NCO 105, baseband signal tracking is achieved.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A method for joint data-pilot tracking of a navigation signal, the method comprising:

1) accomplishing carrier removal by: multiplying a digital intermediate frequency (IF) signal of the navigation signal with an inphase branch of a local carrier to yield an inphase-branch signal I, and multiplying the digital IF signal with a quadrature branch of the local carrier to yield a quadrature-branch signal Q; wherein the digital IF signal comprises a data-channel component and a pilot-channel component that have the same frequency and a constant phase difference; the local carrier is generated by a local-carrier generator that is controlled by a carrier numerically controlled oscillator (NCO); and the inphase branch of the local carrier is derived from a cosine mapping of the local carrier, and the quadrature branch of the local carrier is derived from a sine mapping of the local carrier;

2) accomplishing code removal by:
   2a) multiplying an early instance, a prompt instance, and a late instance of a data baseband signal with the inphase-branch signal I to yield an inphase-early data signal, an inphase-prompt data signal, and an inphase-late data signal, respectively; wherein the early instance of the data baseband signal is generated by a data-baseband-signal generator that is controlled by a code NCO; and the prompt instance and the late instance of the data baseband signal are generated by delaying the early instance of the data baseband signal by a first delay time and a second delay time with a data time delayer, respectively;
   2b) multiplying the early instance, the prompt instance, and the late instance of the data baseband signal with the quadrature-branch signal Q to yield a quadrature-early data signal, a quadrature-prompt data signal, and a quadrature-late data signal, respectively;
   2c) obtaining a phase-shifted inphase signal I' by shifting a phase of the inphase-branch signal I by a phase that is equal to the constant phase difference; and multiplying an early instance, a prompt instance, and a late instance of a pilot baseband signal with the phase-shifted inphase signal I' to yield an inphase-early pilot signal, an inphase-prompt pilot signal, and an inphase-late pilot signal, respectively; wherein the early instance of the pilot baseband signal is generated by a pilot-baseband-signal generator that is controlled by the code NCO; and the prompt instance and the late instance of the pilot baseband signal are generated by delaying the early instance of the pilot baseband signal by a third delay time and a fourth delay time with a pilot time delayer, respectively; and
   2d) obtaining a phase-shifted quadrature signal Q' by shifting a phase of the quadrature-branch signal Q by the phase; and multiplying the early instance, the prompt instance, and the late instance of the pilot baseband signal with the phase-shifted quadrature signal Q' to yield a quadrature-early pilot signal, a quadrature-prompt pilot signal, and a quadrature-late pilot signal, respectively;

3) obtaining coherent integration results by:
   3a) processing the inphase-early data signal, the inphase-prompt data signal, and the inphase-late data signal with first integration-and-dump units to obtain a data inphase-early coherent integration result $I_{DE}$, a data inphase-prompt coherent integration result $I_{DP}$, and a data inphase-late coherent integration result $I_{DL}$, respectively;
   3b) processing the quadrature-early data signal, the quadrature-prompt data signal, and the quadrature-late data signal with second integration-and-dump units to obtain a data quadrature-early coherent integration result $Q_{DE}$, a data quadrature-prompt coherent integration result $Q_{DP}$, and a data quadrature-late coherent integration result $Q_{DL}$, respectively;
   3c) processing the inphase-early pilot signal, the inphase-prompt pilot signal, and the inphase-late pilot signal with third integration-and-dump units to obtain a pilot inphase-early coherent integration result $I_{PE}$, a pilot inphase-prompt coherent integration result $I_{PP}$, and a pilot inphase-late coherent integration result $I_{PL}$, respectively; and
   3d) processing the quadrature-early pilot signal, the quadrature-prompt pilot signal, and the quadrature-late pilot signal with fourth integration-and-dump units to obtain a pilot quadrature-early coherent integration result $Q_{PE}$, a pilot quadrature-prompt coherent integration result $Q_{PP}$, and a pilot quadrature-late coherent integration result $Q_{PL}$, respectively;

4) using prompt-instance coherent integration results of the coherent integration results to obtain a data-bit-flip-detection output Flip=sign($I_{PP} \times I_{DP} + Q_{PP} \times Q_{DP}$) so to accomplish a data-bit flip detection; wherein prompt-instance coherent integration results comprise $I_{DP}$, $Q_{DP}$, $I_{PP}$, and $Q_{PP}$, sign denotes a signbit function, and sign (x) provides an output +1 when x is greater than or equal to 0 and an output −1 when x is less than 0;

5) using a power ratio between the data-channel component and the pilot-channel component to calculate a power-weighting factor $$\alpha_1 = \sqrt{\frac{P_1}{P_2}},$$

where, $P_1$ and $P_2$ denote a power of the data-channel component and a power of the data-channel component, respectively;

6) using the prompt-instance coherent integration results to calculate a probability-weighting factor $\alpha_2$; wherein $\alpha_2$ and a correction-probability of the data-bit flip detection are decreased along with an increase of an angle between a first vector ($I_{DP}$, $Q_{DP}$) and a second vector ($I_{PP}$, $Q_{PP}$) when the angle is between the range 0-90°; and $\alpha_2$ and the correction-probability of the data-bit flip detection are increased along with an increase of the angle between the first vector ($I_{DP}$, $Q_{DP}$) and the second vector ($I_{PP}$, $Q_{PP}$) when the angle is between the range 90-180°;

7) calculating an inphase-prompt coherent integration result $I_P$ and a quadrature-prompt coherent integration result $Q_P$ by using the prompt-instance coherent integration results according to formulas as follows:

$$I_P = I_{PP} + \text{Flip} \times I_{DP} \times \alpha_1 \quad Q_P = Q_{PP} + \text{Flip} \times Q_{DP} \times \alpha_1$$

performing phase-discrimination to the inphase-prompt coherent integration result $I_P$ and the quadrature-prompt coherent integration result $Q_P$ to obtain a phase-discrimination output $\Delta\varphi$, multiplying the phase-discrimination output $\Delta\varphi$ with the probability-weighting factor $\alpha_2$ and performing loop-filtering to obtain a data-pilot joint carrier tuning-amount; feeding the data-pilot joint carrier tuning-amount back to the carrier NCO, and tuning the carrier NCO to realize data-pilot joint signal carrier tracking;

8) calculating an inphase-early coherent integration result $I_E$, an inphase-late coherent integration result $I_L$, a quadrature-early coherent integration result $Q_E$ and a quadrature-late coherent integration result $Q_L$ by using early-instance coherent integration results and late-instance coherent integration results of the coherent integration results according to formulas as follows:

$$I_E = I_{PE} + \text{Flip} \times I_{DE} \times \alpha_1 \quad I_L = I_{PL} + \text{Flip} \times I_{DL} \times \alpha_1$$

$$Q_E = Q_{PE} + \text{Flip} \times Q_{DE} \times \alpha_1 \quad Q_L = Q_{PL} + \text{Flip} \times Q_{DL} \times \alpha_1$$

wherein, the early-branch coherent integration results comprise $I_{DE}$, $Q_{DE}$, $I_{PE}$, and $Q_{PE}$, and the late-branch coherent integration results comprise $I_{DL}$, $Q_{DL}$, $I_{PL}$, and $Q_{PL}$; performing phase-discrimination by using the inphase-early coherent integration result $I_E$, the inphase-late coherent integration result $I_L$, the quadrature-early coherent integration result $Q_E$ and the quadrature-late coherent integration result $Q_L$ to obtain a phase-discrimination result $\Delta\tau$; multiplying the phase-discrimination result $\Delta\tau$ with the probability-weighting factor $\alpha_2$ and performing loop-filtering to obtain a data-pilot joint code tuning-amount; feeding the data-pilot joint code tuning-amount back to the code NCO, and tuning the code NCO to realize baseband signal tracking.

2. The method of claim 1, wherein the digital IF signal is given by the expression as follows:

$$s_{IF}(t) = \sqrt{2P_1} d(t) c_d(t-\tau) e^{j(\omega_{IF} t + \varphi_0)} + \sqrt{2P_2} c_p(t-\tau) e^{j(\omega_{IF} t + \varphi_0 + \vartheta)} + n(t)$$

wherein $P_1$ denotes the power of the data-channel component d(t) denotes the data-bit sign at current moment t; $c_d$ denotes the data-channel spreading code; $\tau$ denotes time delay of signal; $\omega_{IF}$ denotes angular frequency of signal; $\varphi_0$ denotes initial phase of carrier; $\vartheta$ denotes the constant phase difference between the data-channel component and the pilot-channel component $P_2$ denotes the power of the pilot-channel component $c_p$ denotes the pilot-channel spreading code; n(t) denotes noise and other signals those are uncorrelated with the data-channel component and the pilot-channel component.

3. The method of claim 1, wherein in 4), the data-bit-flip-detection output Flip=1 indicates that the data-channel component and the pilot-channel component are in phase, and Flip=−1 indicates that the data-channel component and the pilot-channel component have a phase difference of 180° therebetween.

4. The method of claim 2, wherein in 4), the data-bit-flip-detection output Flip=1 indicates that the data-channel component and the pilot-channel component are in phase, and Flip=−1 indicates that the data-channel component and the pilot-channel component have a phase difference of 180° therebetween.

5. The method of claim 1, wherein, in 6), the probability-weighting factor is $$\alpha_2 = \frac{Q_{PP} \times Q_{DP} + I_{PP} \times I_{DP}}{\sqrt{(I_{DP}^2 + Q_{DP}^2)(I_{PP}^2 + Q_{PP}^2)}}.$$

6. The method of claim 2, wherein, in 6), the probability-weighting factor is $$\alpha_2 = \frac{Q_{PP} \times Q_{DP} + I_{PP} \times I_{DP}}{\sqrt{(I_{DP}^2 + Q_{DP}^2)(I_{PP}^2 + Q_{PP}^2)}}.$$

7. The method of claim 1, wherein in 7), the phase-discrimination is performed by using a pure phase-locked loop phase discriminator.

8. The method of claim 1, wherein in 8), the inphase-early and quadrature-early coherent integration results $I_E$, $Q_E$ as well as the inphase-late and quadrature-late coherent integration results $I_L$, $Q_L$ are performed with non-coherent accumulation respectively to obtain an early non-coherent accumulation result $E_S$ and a late non-coherent accumulation result $L_S$ using the following mathematical formulas:

$$E_S = \sum_{k=1}^{N} (I_E^2(k) + Q_E^2(k))$$

$$L_S = \sum_{k=1}^{N} (I_L^2(k) + Q_L^2(k))$$

wherein N denotes the number of times of the non-coherent accumulation; and the phase-discrimination is performed on the early non-coherent accumulation result $E_S$ and the late non-coherent accumulation result $L_S$ to obtain the phase discrimination result $\Delta\tau$.

* * * * *